Figure 1:
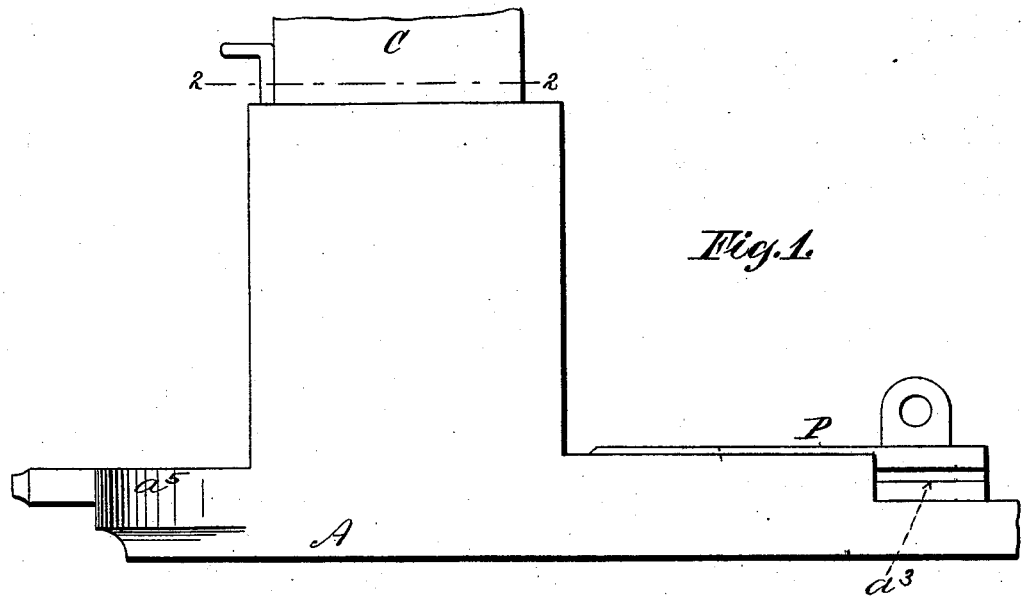

(No Model.) 6 Sheets—Sheet 1.

L. K. JOHNSON & A. A. LOW.
TYPE SETTING APPARATUS.

No. 539,952. Patented May 28, 1895.

Witnesses:
D. W. Gardner
August Hafmann

Inventors
Louis Kossuth Johnson,
Abbot Augustus Low,
By their Attorney
George William Miatt (No Model.) 6 Sheets—Sheet 2.

L. K. JOHNSON & A. A. LOW.
TYPE SETTING APPARATUS.

No. 539,952. Patented May 28, 1895.

(No Model.) 6 Sheets—Sheet 3.

L. K. JOHNSON & A. A. LOW.
TYPE SETTING APPARATUS.

No. 539,952. Patented May 28, 1895.

Witnesses:

Inventors:
Louis Kossuth Johnson,
Abbot Augustus Low,
By their Attorney
George William Miatt, (No Model.) 6 Sheets—Sheet 4.

L. K. JOHNSON & A. A. LOW.
TYPE SETTING APPARATUS.

No. 539,952. Patented May 28, 1895.

Witnesses:
D. W. Gardner.
August Hafmann

Inventors:
Louis Kossuth Johnson,
Abbot Augustus Low,
By their Attorney
George William Miatt (No Model.) 6 Sheets—Sheet 5.

L. K. JOHNSON & A. A. LOW.
TYPE SETTING APPARATUS.

No. 539,952. Patented May 28, 1895.

Witnesses:
D. W. Gardner.
August Hofmann

Inventors:
Louis Kossuth Johnson,
Abbot Augustus Low,
By their Attorney
George William Miatt

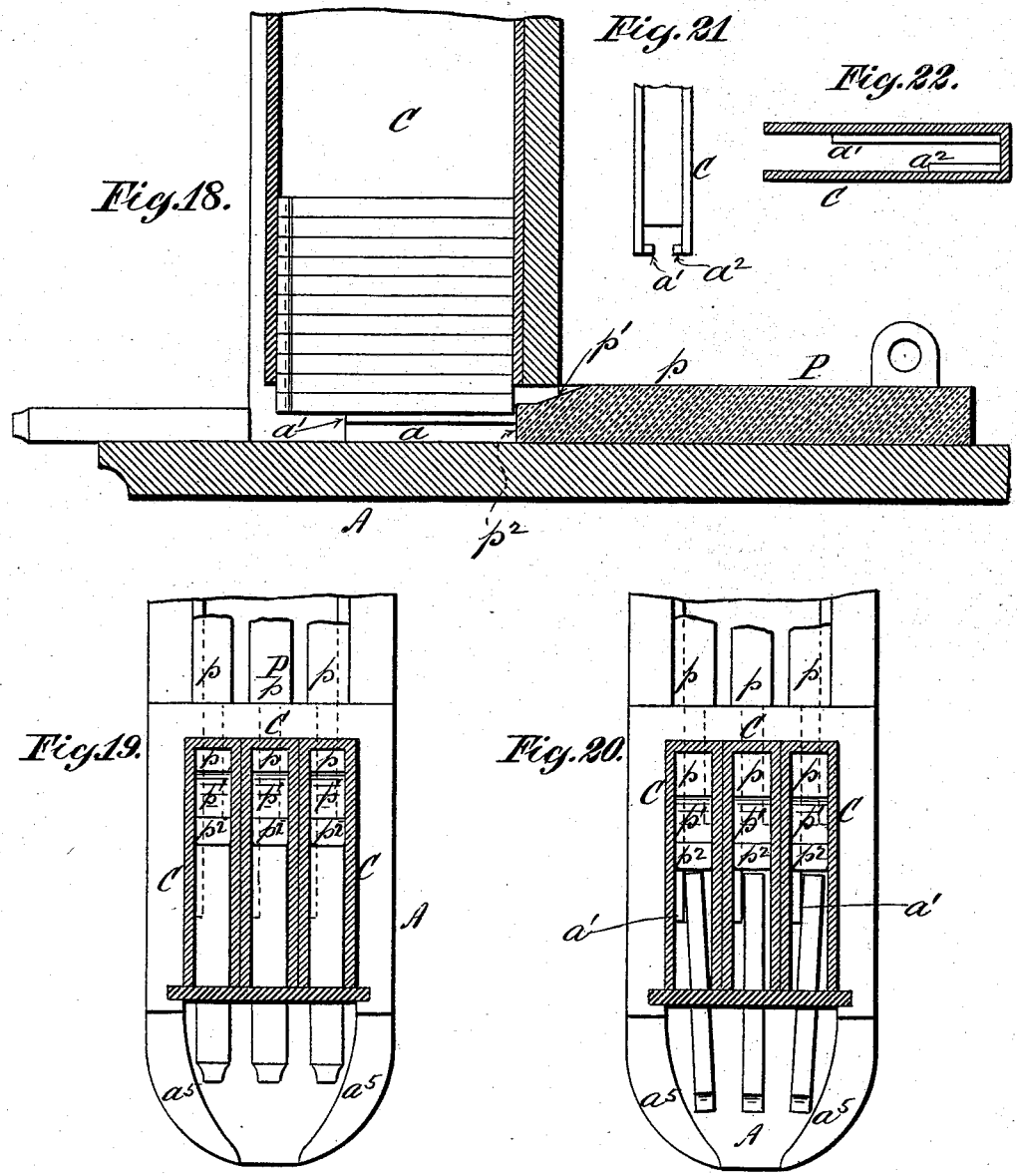

UNITED STATES PATENT OFFICE.

LOUIS KOSSUTH JOHNSON AND ABBOT AUGUSTUS LOW, OF BROOKLYN, ASSIGNORS TO THE ALDEN TYPE MACHINE COMPANY, OF NEW YORK, N. Y.

TYPE-SETTING APPARATUS.

SPECIFICATION forming part of Letters Patent No. 539,952, dated May 28, 1895.

Application filed November 12, 1894. Serial No. 528,545. (No model.)

*To all whom it may concern:*

Be it known that we, LOUIS KOSSUTH JOHNSON and ABBOT AUGUSTUS LOW, citizens of the United States, residing in the city of Brooklyn, in the county of Kings and State of New York, have invented certain new and useful Improvements in Type-Setting Apparatus, of which the following is a specification sufficient to enable others skilled in the art to which the invention appertains to make and use the same.

Our improvements relate to the class of type setting apparatus in which the types are arranged in prescribed positions with relation to each other in type containing channels from the lower ends of which they are successively forwarded into position to be grasped by the fingers of the compositor for removal to the stick.

Our present application is for special means for effecting the turning of the types, when arranged upon their flat sides in the containing channels, onto their edges during the operation of forwarding them successively into position for the compositor, our main object being to effect this turning of the types as quickly as possible, and while still under the containing channels, the types being turned within their own length, and the stroke of the pusher and projection of the type presenting platform being consequently reduced. This we accomplish by the use of two very narrow type supporting shoulders, one on each side of the lower end of the type containing channels, and one considerably shorter than the other, so that the lowest types will be supported squarely until relieved of the pressure of the column above by the lifting pusher, by which time the heel of the type will just about clear and pass beyond the front end of the shorter supporting shoulder, when the type will naturally fall from the longer shoulder, making a quarter turn as it does so owing to the action of the said longer shoulder in supporting one side of the type until inclined sufficiently to drop therefrom.

Another feature of our invention consists in the special construction of the pusher, and in forming each pusher finger with a selecting point or edge by which the lowest type in a column is chosen and started forward without disturbing the type next above until the latter is reached by the column-elevating surface on the pusher.

Figure 3:
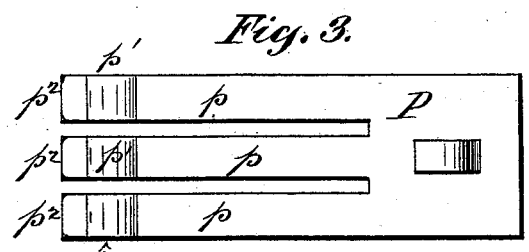
Figure 2:
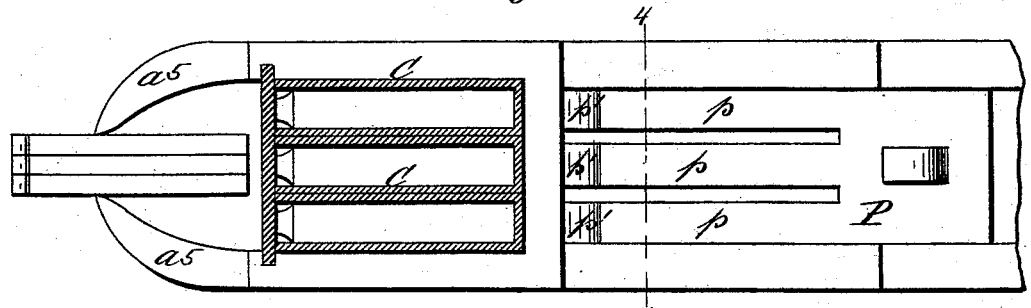
Figure 4:
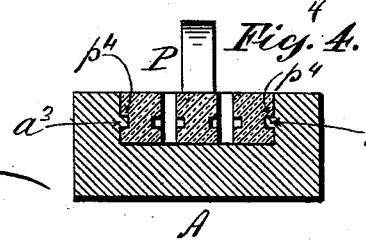
Figure 5:
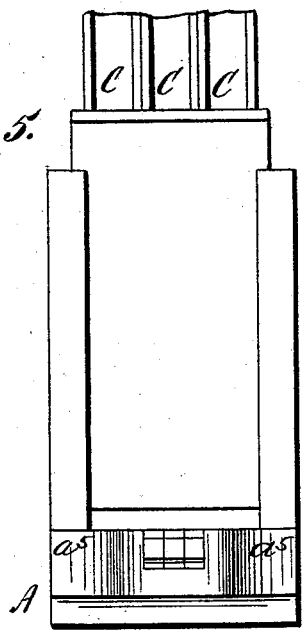
Figure 7:
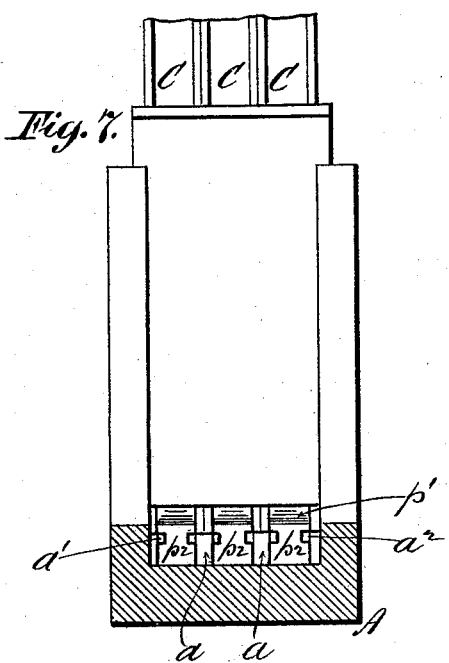
Figure 6:
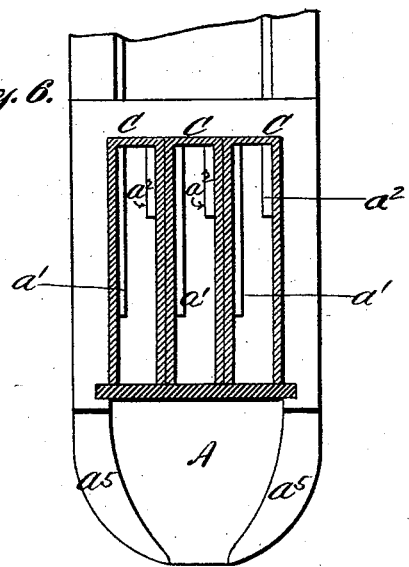
Figure 8:
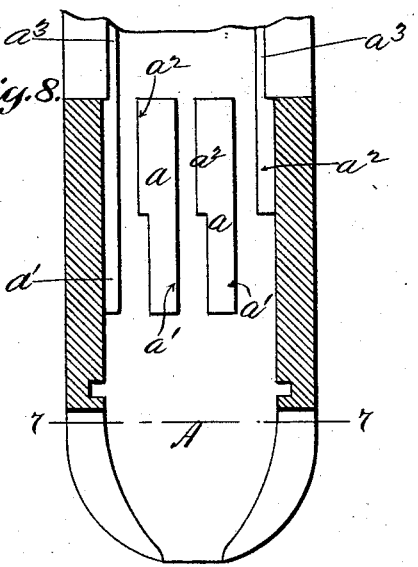
Figure 9:
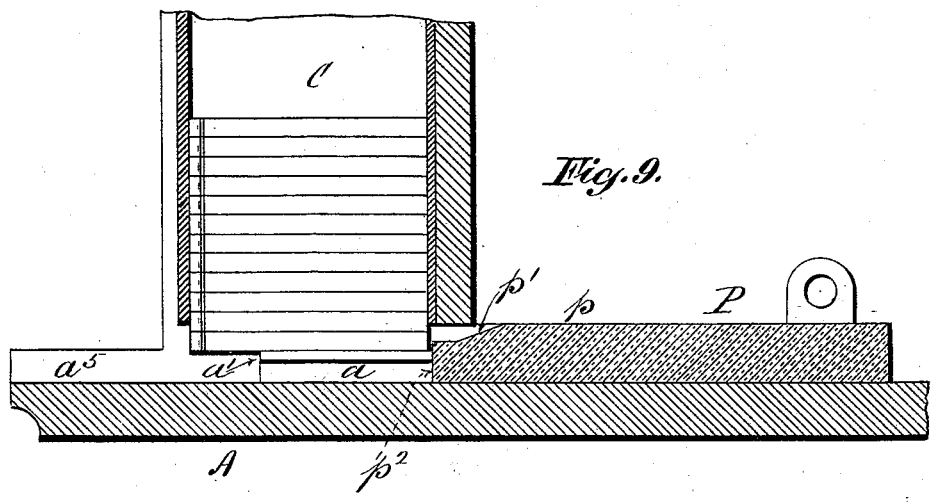
Figure 10:
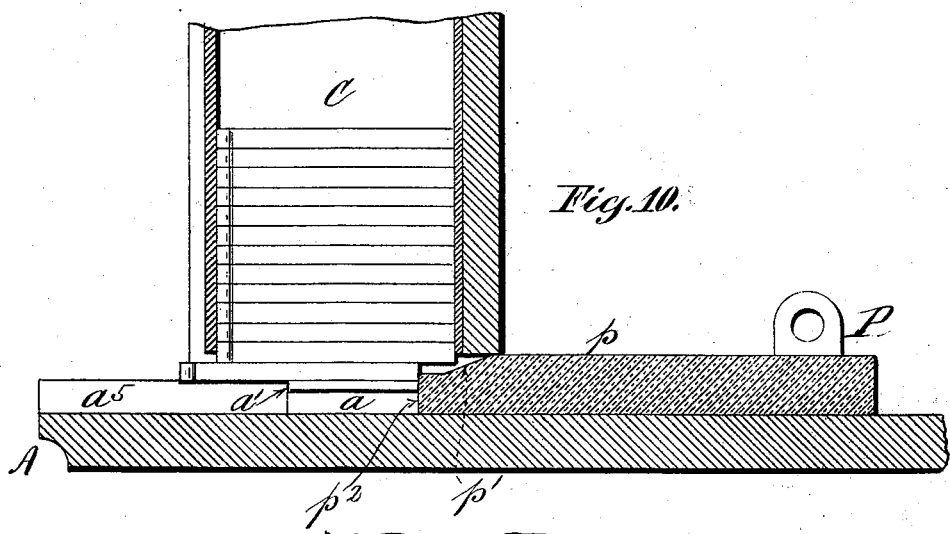
Figure 11:
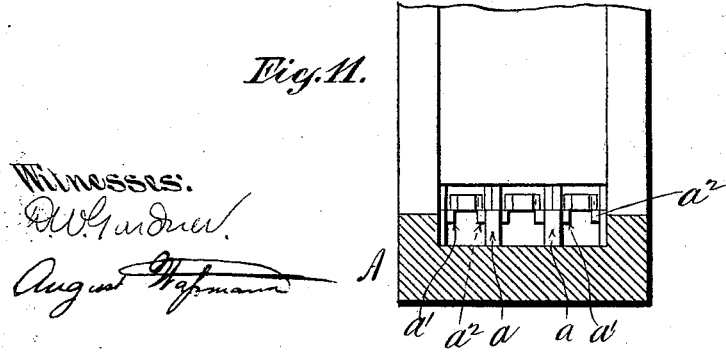
Figure 12:
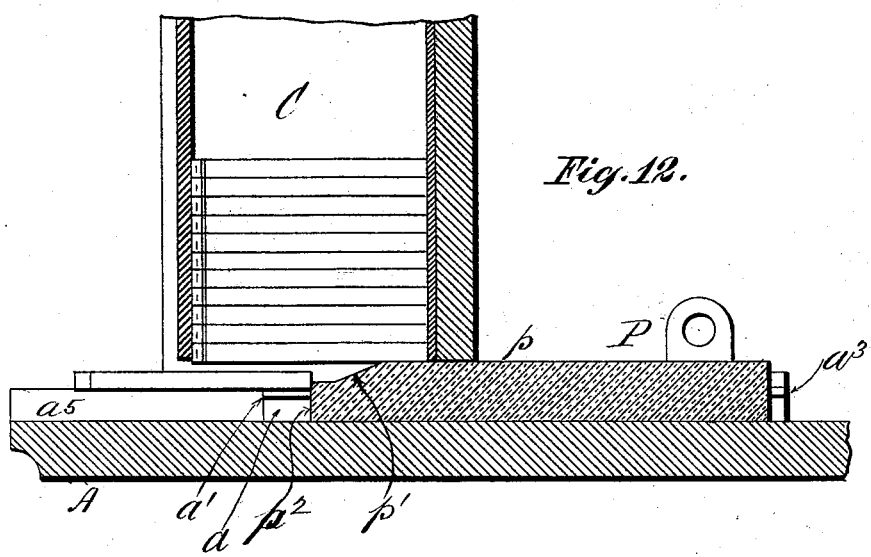
Figure 13:
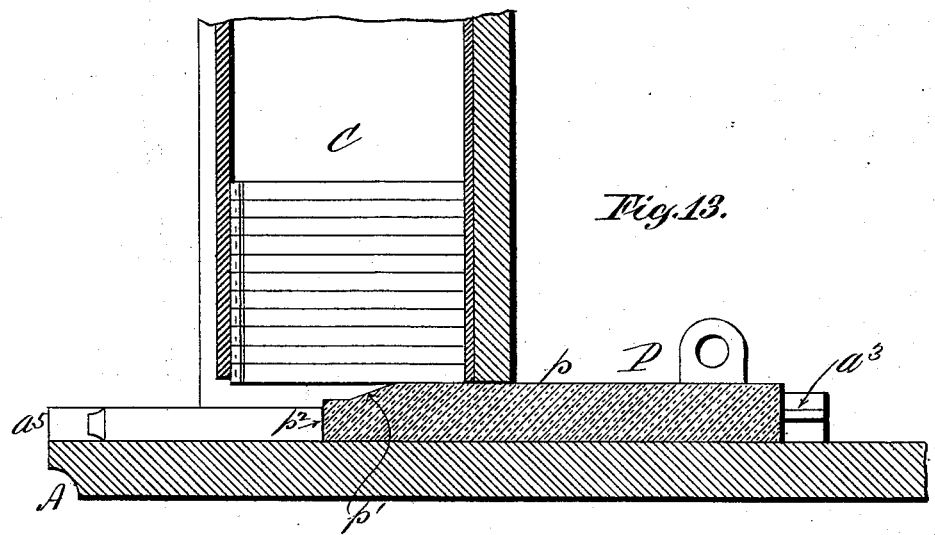
Figure 14:
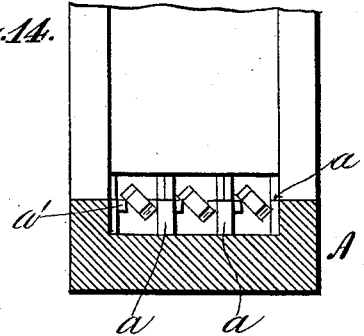
Figure 15:
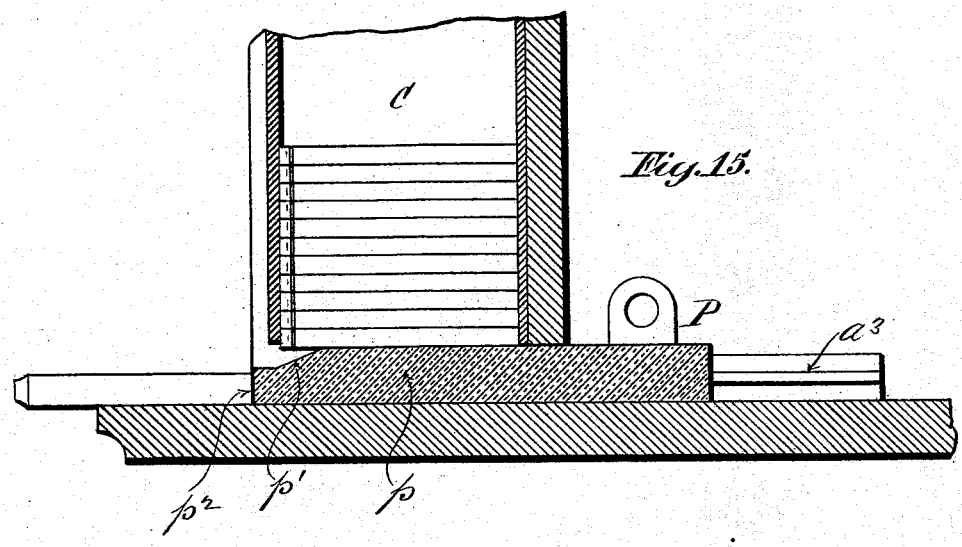
Figure 16:
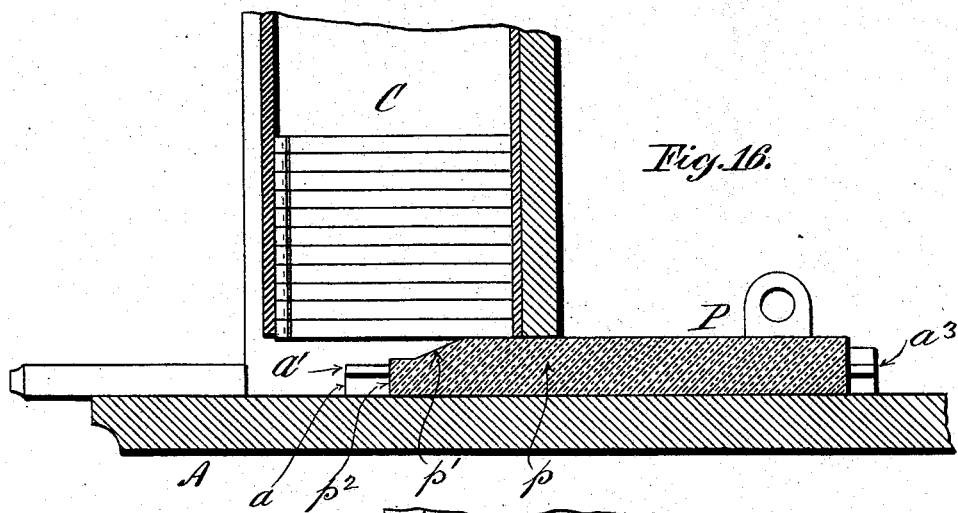
Figure 17:
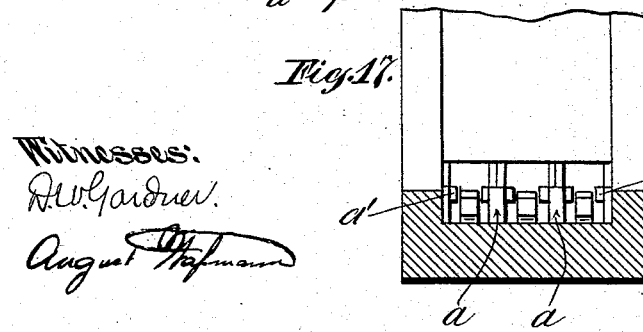

In the accompanying drawings, Figure 1 is a side elevation of our improved device. Fig. 2 is a horizontal section upon plane of line 2 2, Fig. 1, showing a plan of the device. Fig. 3 is a top view of the pusher; Fig. 4, a transverse section upon line 4 4, Fig. 2; Fig. 5, a front elevation; Fig. 6, a horizontal section similar to Fig. 2, the types and pusher being omitted. Fig. 7 is a section upon plane of line 7 7, Fig. 8. Fig. 8 is a horizontal section through the walls of the channel-holder, the channel and other parts being omitted. Fig. 9 is a longitudinal section showing the pusher in its retracted position. Fig. 10 is a similar view showing the action of the pusher-fingers in selecting the lowest types; Fig. 11, a transverse section of the type-platform, showing the lowest types resting upon the type-supporting shoulders. Fig. 12 is a longitudinal section showing the column of type supported by the pusher and the lowest type ready to fall to the type-platform; Fig. 13, a similar view just after the type has so fallen. Fig. 14 is a view similar to Fig. 11, showing the lowest types in the act of turning as they descend to the type-platform; Fig. 15, a view showing the parts at the completion of the forward stroke of the pusher; Fig. 16, a similar view showing the pusher supporting the column of type during its retractile movement; Fig. 17, a view similar to Figs. 11 and 14, showing the types completely turned and resting upon the type-platform. Fig. 18 shows the parts at the completion of the retractile movement of the pusher, with the column of type resting upon our type-supporting shoulders. Fig. 19 is a horizontal section showing the types just about to turn in their descent from the longest type-supporting shoulder; Fig. 20, a similar view after this descent of the types. Figs. 21 and 22 are detail views of the end of a type-containing channel, showing the type-supporting shoulders formed thereon instead of upon the type-platform.

The type containing channels C, C, are supported in a common holder as heretofore, said holder resting upon the type platform A. The lower ends of the channels rest upon shelves $a$, $a$, projecting upward from the type platform. These shelves are sufficiently wide to project beyond the side walls of the type containing channels and into the line of the column of types, forming, when the channels are in position, type supporting shoulder $a'$, and $a^2$, for each channel. If preferred these shoulders $a'$, and $a^2$, may be formed directly upon the ends of the channels as shown in Figs. 21 and 22. In either case one shoulder $a^2$, is shorter than the other, so that when a type is forwarded beyond its front end said type will be free to turn upon its longitudinal axis while the edge of the longer type supporting shoulder $a'$, acts pivotally to insure the turning of the type. Before the turning and descent of the type can be effected as above set forth it is necessary to relieve it of the weight of the column of type above, and this we accomplish by making the fingers $p$, $p$, on the pusher P, of sufficient height to so raise and support the type column after the heel of the next lowest type has encountered the inclined surface $p'$. In order however to guard against the straining of the next lowest type longitudinally, and to effect the selection of the lowest type solely and positively, we form the front end of each finger with a selecting point $p^2$, of such height that only a portion of the heel of the lowest type comes in contact therewith, resulting, as will be seen by reference to Fig. 10, in the starting and cutting off of the lowest type before the heel of the next lowest has encountered the incline $p'$.

The pusher P, is guided in its reciprocation by the tenons $a^3$, which fit in the grooves $p^4$, in the sides of the pusher, which latter is reciprocated intermittently through the medium of automatic devices heretofore described and claimed by us, but not necessary to be shown in this connection.

The opperation of our device is as follows: The parts being in the position shown in Fig. 9, the pusher fingers $p$, or rather the selecting points $p^2$, thereof, first encounter the heels of the lowest types, starting them forward. The continued forward movement finally brings the incline $p'$, into contact with the heel of the next succeeding type, the fingers $p$, thus gradually lifting the columns of type while the lowest types are being forwarded. At about the time this has been accomplished the heels of the lowest types have passed beyond the shorter type supporting shoulders $a^2$, leaving the said lowest types free to turn upon and from the longer type supporting shoulders $a'$. It will be seen that this action occurs while the types are still well within the lines of the type containing channels so that the types, being now free from restraint, can be made to converge and come together at the front of the type platform, projecting beyond the edge thereof as heretofore. The converging of the types is controlled by the side walls $a^5$, extending from the channels, and centralizing the type as shown in Fig. 2. During the retractile movement of the pusher the heel of the next lowest type gradually descends the incline $p'$, and the column is again supported upon the type shoulders $a'$, and $a^2$.

By dividing the support of the columns of type by means of the comparatively narrow type supporting shoulders on either side of the channels we support the lowest types against the weight of the columns above more effectively, while providing for the immediate turning and descent of said lowest types as soon as relieved from the pressure of the columns above. By selecting and starting forward the lowest types without contact with the next succeeding lowest types, and before the action of the pusher in raising the columns again, we avoid all disturbance of the types in their proper relation to each other and render the operation of selecting, detaching, and forwarding the types more delicate and accurate.

What we claim as our invention, and desire to secure by Letters Patent, is—

1. In a type case the combination of the channel holder formed with type supporting shoulders upon both sides of the channels, and a type forwarder formed with fingers which pass between said type supporting shoulders substantially in the manner and for the purpose described.

2. In a type case the combination of the type platform, channel holder, channels, and type supporting shoulders upon both sides of the channels, with a type forwarder having fingers formed with selecting points which detach the lowest types, substantially in the manner and for the purpose set forth.

3. In a type case the combination of a type platform formed with converging side walls, and with type supporting shoulders which support the lowest types on both edges, of a channel holder and channels and type forwarding mechanism substantially such as described.

4. In a type case the combination of a type platform and channel holder formed with type supporting shoulders on both sides of the channels, said shoulders on one side being shorter than the others, and a type forwarder formed with fingers which pass between the said type supporting shoulders, substantially in the manner and for the purpose described.

5. In combination with a type channel and independent means of support for the lowest type therein, a type forwarder formed with a type selecting finger substantially in the manner and for the purpose described.

6. The combination of a type containing channel, an independent support for the lowest type contained therein, and a type forwarder formed with a type selecting edge and a type elevating surface, substantially in the manner and for the purpose described.

LOUIS KOSSUTH JOHNSON.
ABBOT AUGUSTUS LOW.

Witnesses:
D. W. GARDNER,
GEORGE WILLIAM MIATT.